Nov. 4, 1969 C. W. JONES 3,475,800
APPARATUS FOR FORMING CONTINUOUS PRE-STRESSED CONCRETE SLABS
Filed Oct. 17, 1966 7 Sheets-Sheet 1
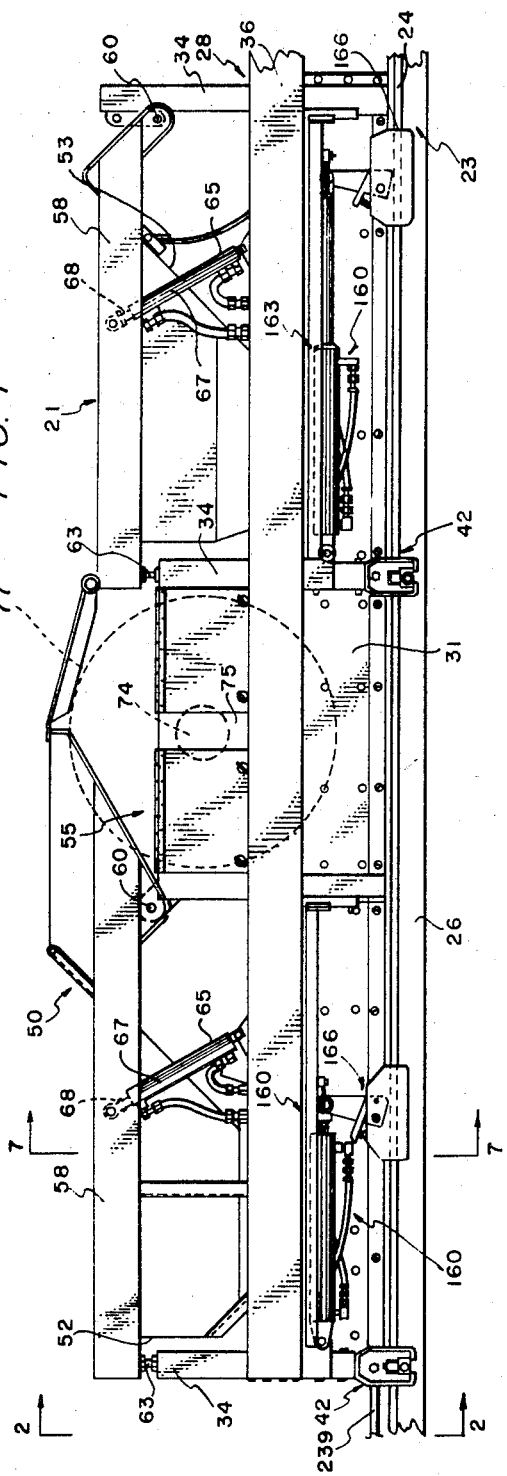
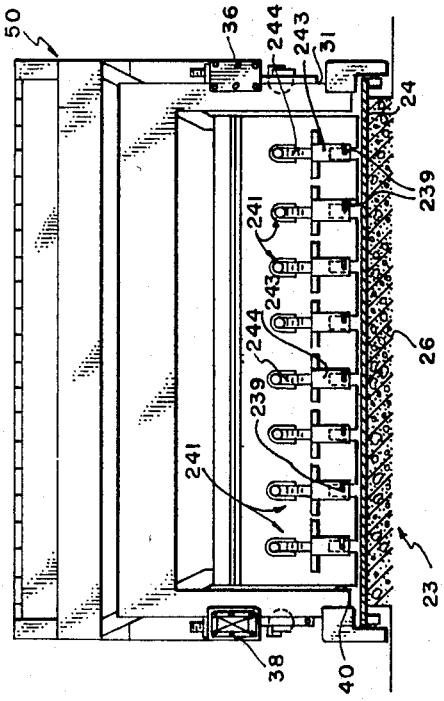
INVENTOR.
CORDIS W. JONES
BY *John H. Widdowson*
*Phillip A. Rein*
ATTORNEYS

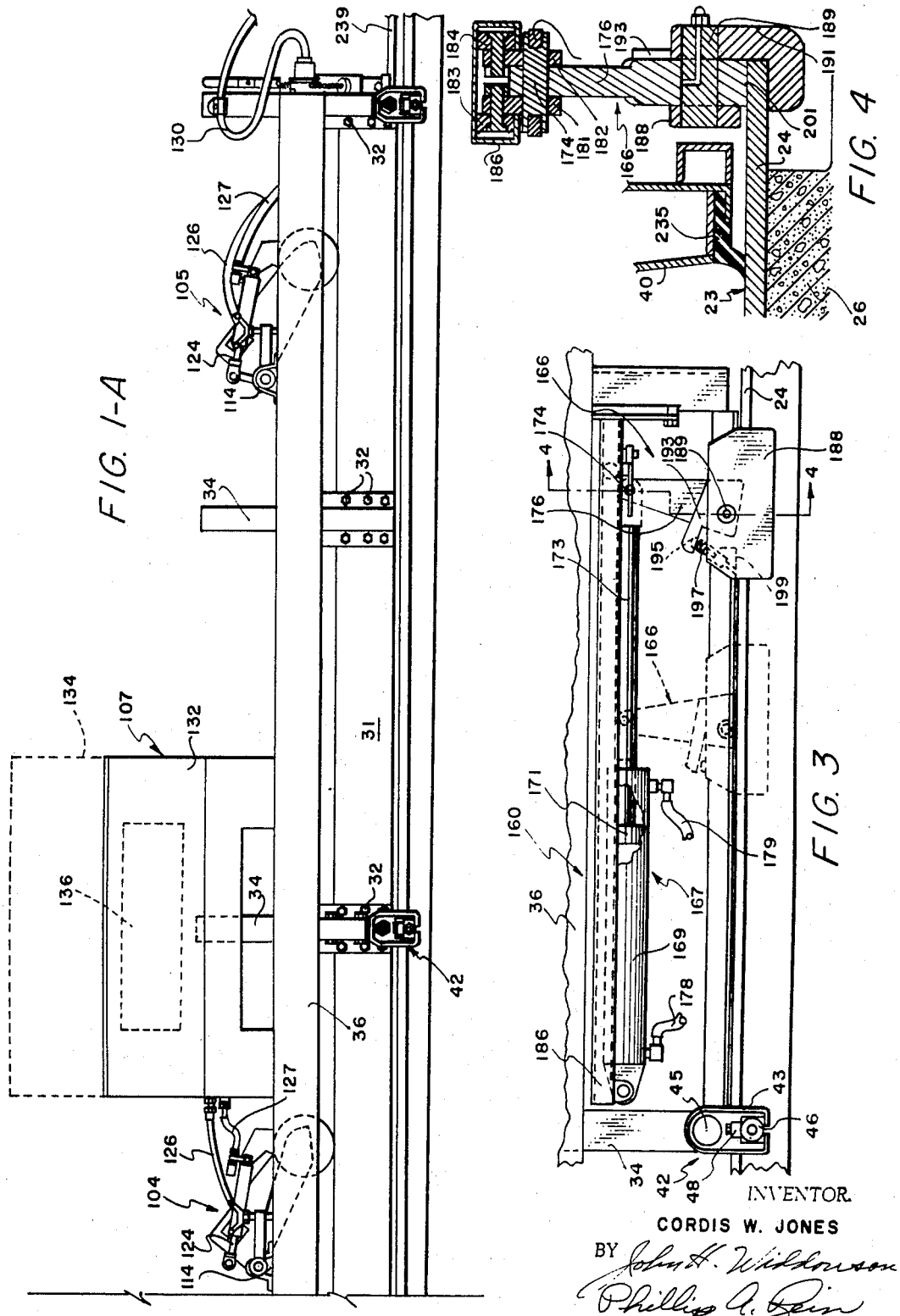

Nov. 4, 1969
C. W. JONES
3,475,800
APPARATUS FOR FORMING CONTINUOUS PRE-STRESSED CONCRETE SLABS
Filed Oct. 17, 1966
7 Sheets-Sheet 3
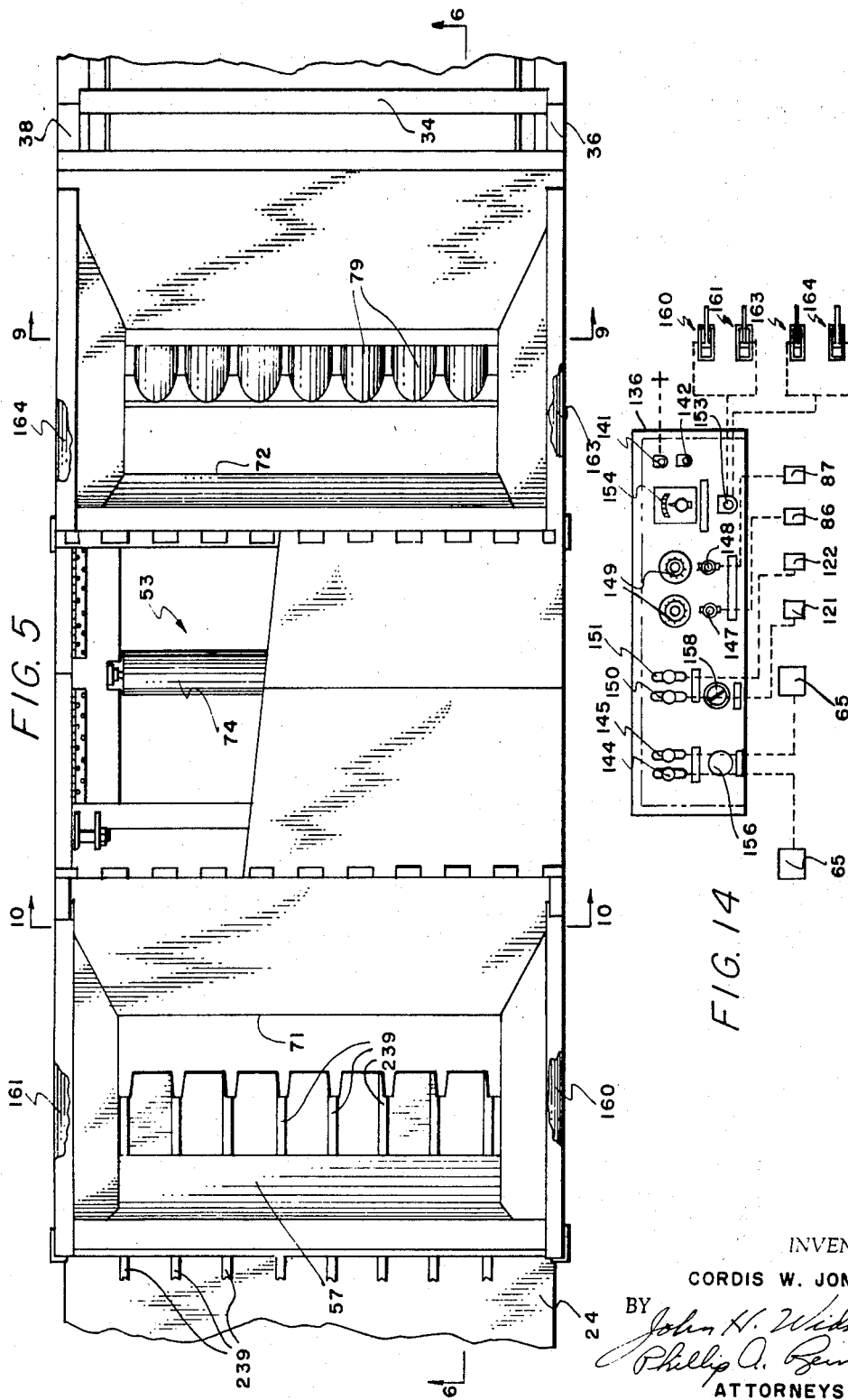
INVENTOR.
CORDIS W. JONES
BY
John H. Wilkinson
Phillip A. Benn
ATTORNEYS

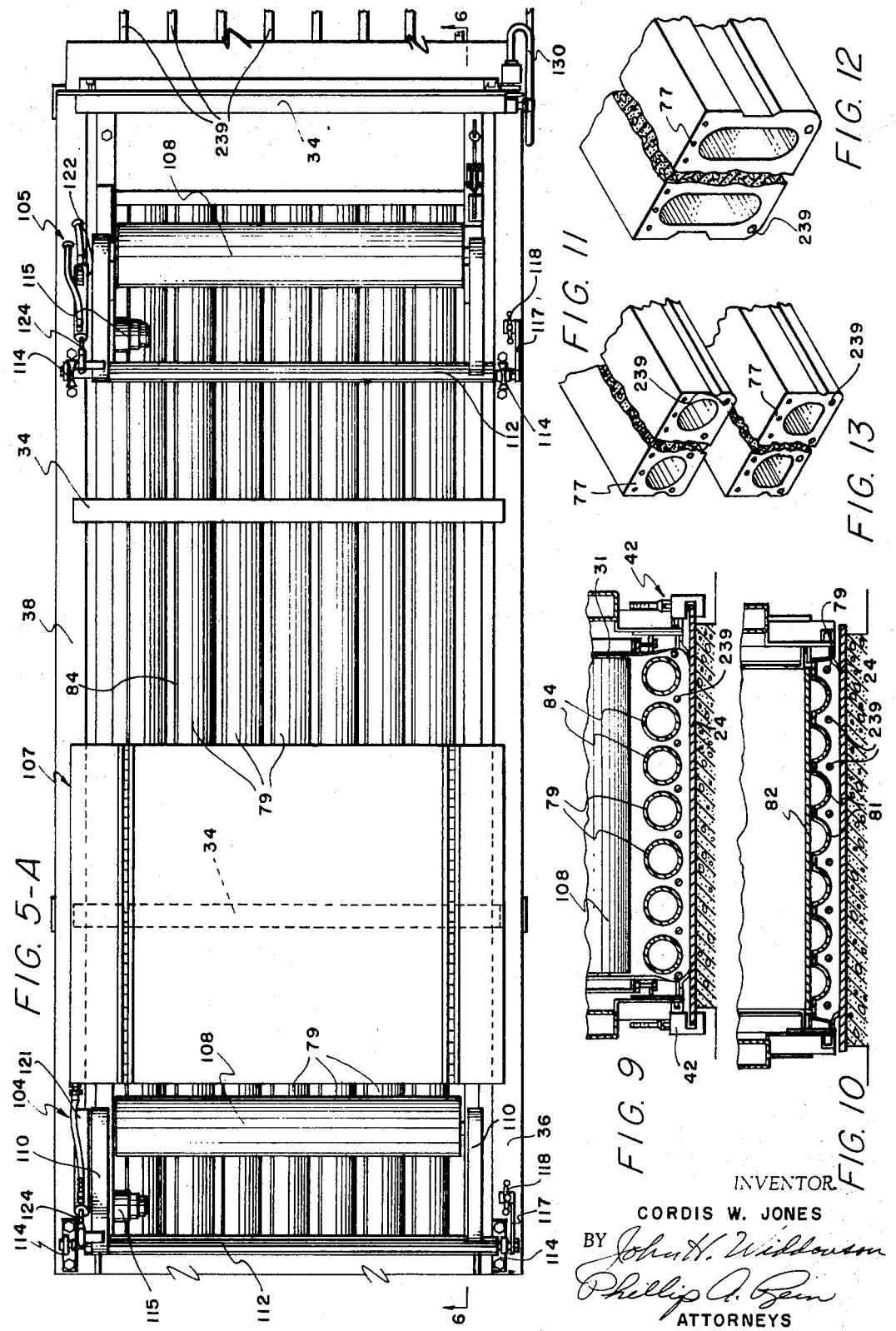

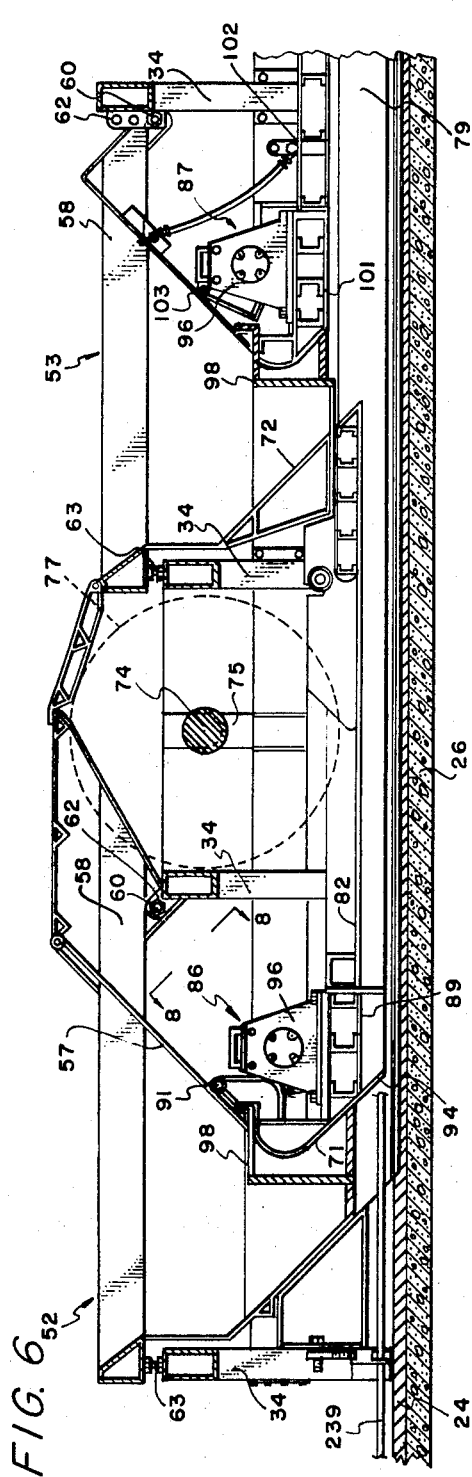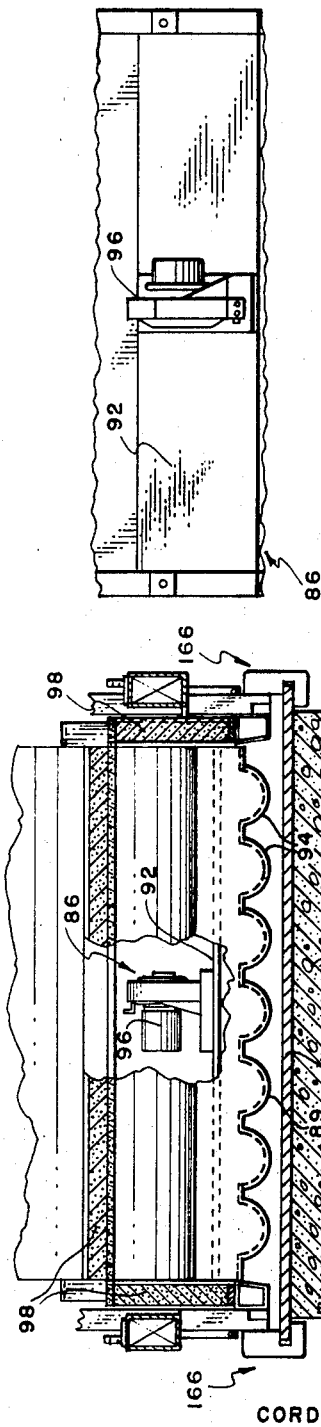

Nov. 4, 1969
C. W. JONES
3,475,800
APPARATUS FOR FORMING CONTINUOUS PRE-STRESSED CONCRETE SLABS
Filed Oct. 17, 1966
7 Sheets-Sheet 2
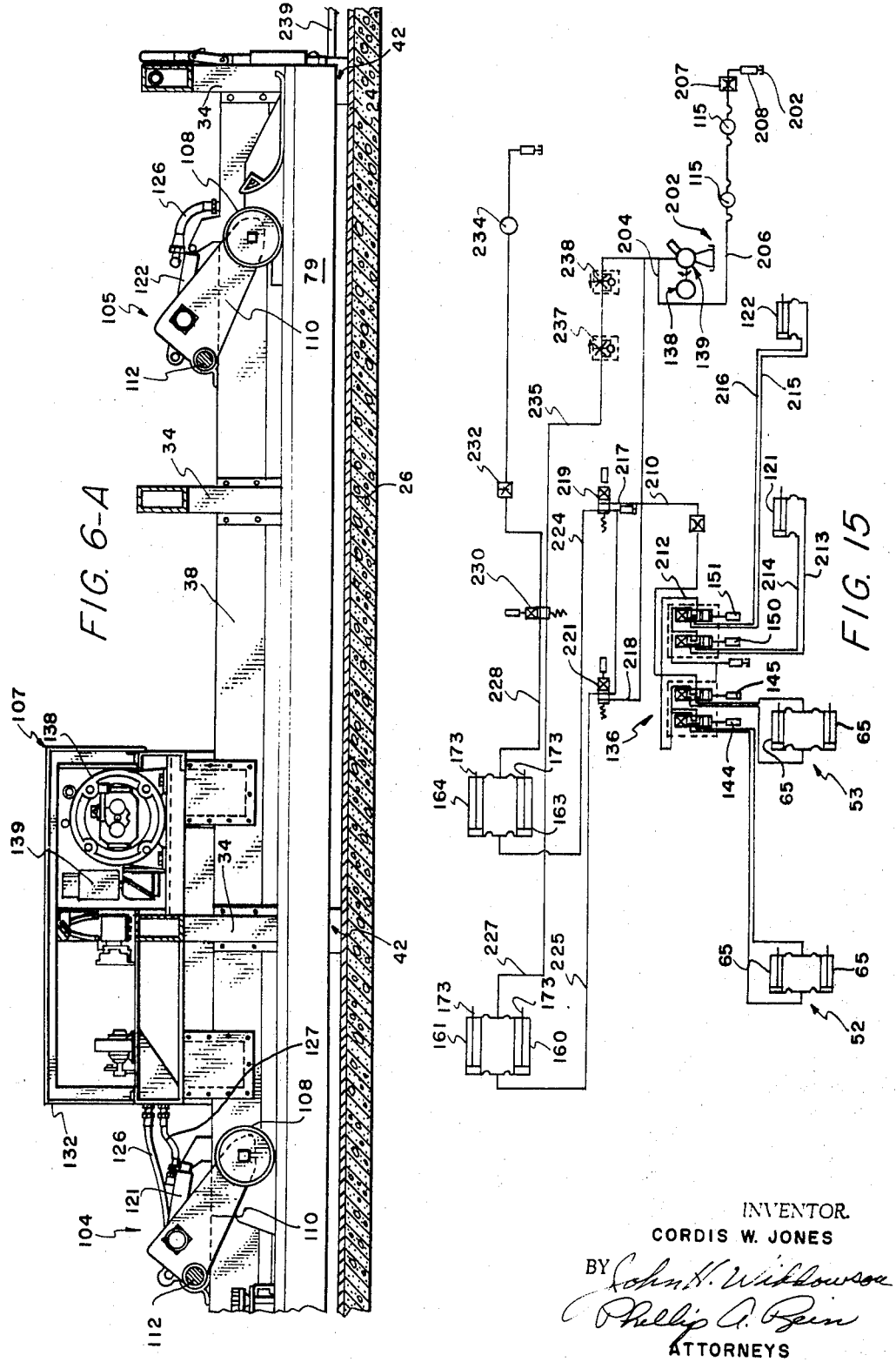
INVENTOR.
CORDIS W. JONES
BY
ATTORNEYS

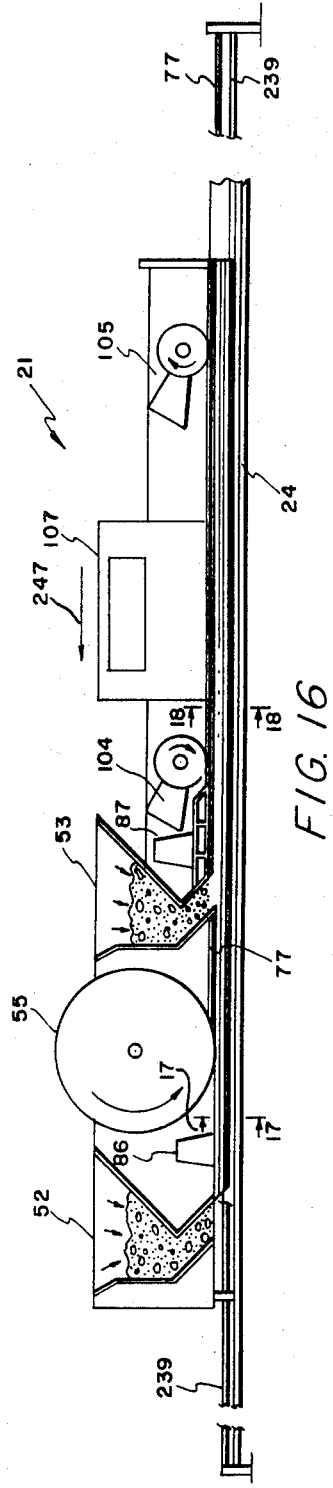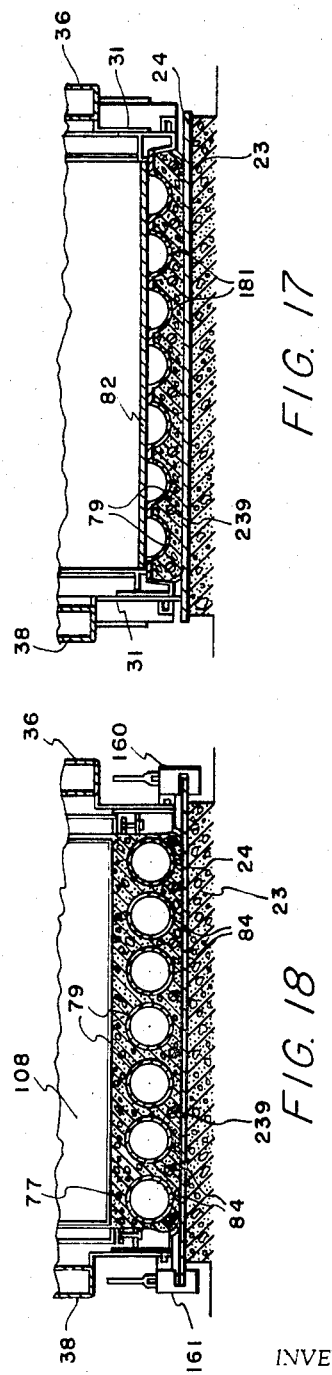

United States Patent Office 3,475,800
Patented Nov. 4, 1969

3,475,800
APPARATUS FOR FORMING CONTINUOUS
PRE-STRESSED CONCRETE SLABS
Cordis W. Jones, Englewood, Colo.
(P.O. Box 1386, Salina, Kans. 67401)
Filed Oct. 17, 1966, Ser. No. 587,041
Int. Cl. B28b 7/18, 23/06
U.S. Cl. 25—41                                7 Claims

ABSTRACT OF THE DISCLOSURE

This disclosure relates to a machine and method of producing hollow cored concrete slabs in a continuous operation from an initial concrete material having a slump test in the range of 0.5 to 4.0 per ASTM testing. More particularly, this invention is an apparatus being self-propelled including a support frame having elongated upright side walls with tubular members therebetween to continuously form, vibrate, trowel, the concrete material so as to extrude an elongated pre-stressed reinforced cored concrete slab.

Various types of concrete slab forming machines are known to the prior art operable to produce reinforced cored concrete slabs from a relatively dry or no slump concrete mixture. The prior art devices cannot produce a continuous cored concrete slab from an initial slump test concrete material and still be self-supporting shortly after being poured. Additionally, the prior art devices are limited as to size and shape of the resultant cored slabs produced and the final quality thereof. Also, the prior art slab forming machines are structurally complicated, limited in usage, and cannot operate to automatically produce the desired pre-stressed, reinforced cored concrete slabs.

In accordance with the present invention, a new apparatus for producing pre-stressed cored concrete slabs is provided which includes a self-propelled forming machine adapted for longitudinal movement along an elongated base bed or pallet. A plurality of pre-stressed strand members are connectable to the pallet and extended the length thereof so as to be within the final cored concrete slab. The machine includes a pair of spaced upright sidewalls engageable with the pallet having first and second concrete hoppers secured thereto adapted to discharge concrete material onto the pallet and about the strands. A mesh discharge means is secured to the sidewalls positioned between the concrete hoppers and operable to place a heavy wire reinforcing mesh into the concrete material from the second hopper. A plurality of horizontally extended, parallel core members secured to the sidewalls are positioned adjacent the pallet and extended rearwardly of the first hopper. Vibration means are secured to the rearward side of the first and second hoppers, respectively, operable to contact the adjacent upper surface of the discharged concrete material to smooth and settle the same. The machine further includes a power means operable to continuously and gradually move the machine along the pallet resulting in the production of an elongated hollow cored pre-stressed, reinforced concrete slab of almost any length.

The method of this invention operates to apply successive layers of a slump type concrete mixture to a supporting pallet within the lateral confines of upright sidewalls of the machine. A plurality of steel strands are placed over the pallet under tension with opposite ends secured thereto so that the strands are adjacent the upper surface of the pallet. The first layer of concrete is applied to a forward portion of the elongated core members. A wire mesh material in combination with a second layer of the slump concrete mixture is applied to an intermediate portion of the core members to form the final shape thereof with the axial movement of the core members through the freshly poured concrete material operating to hold the same for a period of time to achieve self-supporting rigidity and wipe the inner surface of the hollowed core portions formed therein. The continuous movement of the machine operated to produce a self-supporting longitudinally extended reinforced pre-stressed cored concrete slab of any desired length.

In preferred specific embodiments of the invention, a concrete slab forming machine is provided including a support frame having a pair of upright sidewalls interconnected by transversely extended beam members. The sidewalls are slidably connected to an elongated bed or pallet by a plurality of spaced roller assemblies. At the forwardmost end of the support frame are a plurality of guide strand holders operable to train and space a plurality of horizontally extended tensioned strands adjacent the upper surface of the pallet. Immediately rearwardly therefrom is a first hopper operable to supply a slump type concrete mixture to the pallet between the lateral confines of the sidewalls. Mounted between and secured to the sidewalls is a plurality of horizontal spaced core members extended from the first hopper rearwardly to the end of the support frame. The core members have a horizontally extended support plate secured to the initial or forward portion of the core members which are of semi-circular shape in transverse cross section whereby the concrete material is so shaped between the pallet, the core members, and the support plate. A reinforcing wire supply means is rotatably connected to the sidewalls and operable to train a wire mesh rearwardly of the first hopper to a position adjacent the upper surface of the core members. After the mesh is applied, a second hopper connected to the sidewalls is operable to discharge more slump type concrete material to the intermediate sections of the core members. Vibrator means secured to the rearward side of the first and second hoppers, respectively, acts to settle the freshly poured concrete material and remove air pockets therefrom. A plurality of spaced troweling machines are connected to the support frame engageable with the upper surface of the freshly poured concrete material resulting in a smoothly finished end product. The sidewalls extend rearwardly of the second hopper a sufficient distance to permit both the troweling and a preliminary setting up of the freshly poured concrete material whereby the machine is moved away therefrom and leaves the same in a self-supporting condition.

Accordingly, it is an object of this invention to provide an improved concrete slab forming machine overcoming the above-mentioned disadvantages of the prior art devices.

Another object of this invention is to provide a concrete slab forming machine operable to form a pre-stressed reinforced cored concrete slab of indefinite length.

Still, another object of this invention is to provide a concrete slab forming machine operable to produce pre-stressed hollow cored concrete slabs from a slump concrete material of 0.5 to 4.0 under ASTM testing.

A further object of this invention is to provide a concrete slab forming machine operable to supply a slump type concrete material along an elongated forming pallet and having means for the self-propelling of the machine, and the troweling and vibration of the concrete material to automatically produce an elongated finished cored concrete slab.

Still, a further object of this invention is to provide a concrete slab forming machine that is operable to produce a hollow cored concrete slab of any desired length having mesh reinforcing and a plurality of pre-stressed members therein thereby resulting in a concrete slab of maximum strength with a minimum of weight.

One other object of this invention is to provide a concrete slab forming machine operable to continuously form a hollow cored concrete slab on the movement of the machine through a given quantity of slump type concrete material whereby the resultant product is self-supporting.

One further object of this invention is to provide a method of producing hollow cored concrete slabs involving the steps of supplying a slump type concrete material to a supporting pallet and continuously moving a plurality of elongated core members through the freshly poured material whereby the end product presents a cored slab structure that is self-supporting even during the initial setting up thereof.

Still, one further object of this invention is to provide a method of producing hollow cored concrete slabs that is automatic in operation, simple to follow, and a procedure which results in considerable savings in material and manpower.

One last object of this invention is to provide an apparatus involving the use of a concrete slab forming machine to produce elongated concrete slabs with a minimum amount of cost, production steps, and effort thereby resulting in a substantial savings in manpower, material, and labor.

Various other objects, advantages and features of this invention will become apparent to those skilled in the art from the following discussion, taken in conjunction with the accompanying drawings, in which:

FIGS. 1 and 1A are elevational views of the concrete slab forming machine of this invention illustrated as mounted on a longitudinally extended pallet;

FIG. 2 is an elevational front end view taken along line 2—2 in FIG. 1;

FIG. 3 is a fragmentary elevational view illustrating one cam shoe drive means of the concrete slab forming machine of this invention;

FIG. 4 is an enlarged fragmentary sectional view taken along line 4—4 in FIG. 3;

FIG. 4A is a fragmentary sectional view of a second embodiment of a sealing means of the concrete slab forming machine of this invention similar to FIG. 4;

FIGS. 5 and 5A are top plan views of the concrete slab forming machine of this invention;

FIGS. 6 and 6A are elevational sectional views taken along line 6—6 in FIGS. 5 and 5A, respectively;

FIG. 7 is a fragmentary sectional view taken along line 7—7 in FIG. 1;

FIG. 8 is a fragmentary perspective view taken along line 8—8 in FIG. 6;

FIG. 9 is a fragmentary sectional view taken along line 9—9 in FIG. 5;

FIG. 10 is a fragmentary sectional view taken along line 10—10 in FIG. 5;

FIGS. 11, 12 and 13 are fragmentary foreshortened perspective views of various embodiments of concrete slab members produced by the concrete slab forming machine of this invention;

FIG. 14 is a schematic diagram of a control panel of the concrete slab forming machine of this invention;

FIG. 15 is a schematic diagram of the hydraulic control means of the concrete slab forming machine of this invention;

FIG. 16 is a schematic diagram illustrating the method of producing cored concrete slabs using the slab forming machine of this invention;

FIG. 17 is a sectional view taken along line 17—17 in FIG. 16; and

FIG. 18 is a sectional view taken along line 18—18 in FIG. 16.

The following is a discussion and description of preferred specific embodiments of the new concrete slab forming machine of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular to FIGS. 1 and 1A, a concrete slab forming machine, indicated generally at 21 is operable to produce prestressed, reinforced hollow cored concrete slabs of substantially unlimited length on a longitudinally extended bed or pallet 23. Preferably, the pallet 23 consists of longitudinally extended steel bed plate 24 rigidly anchored to a correspondingly elongated concrete base 26 so as to provide a support for the machine 21 and a concrete slab to be formed thereon.

More particularly, the concrete slab forming machine 21 includes a heavy duty support frame 28 having a pair of elongated upright sidewalls 31 interconnected as by bolts 32 to a plurality of spaced U-shaped support beams 34 of rectangular tubular shape in transverse cross section. For added rigidity, longitudinally extended tubular members 36 and 38 are connected to each respective sidewall 31 and adjacent vertical portions of the support beams 34 to add substantial horizontal stability thereto. The lower ends of each sidewall 31 has a side mold plate 40 connected thereto operable to form the vertical outer contour of the concrete slab to be formed on the pallet 23 as will be explained.

As shown in FIGS. 1 and 3, the support frame 28 is mounted on the pallet 23 by a plurality of spaced roller assemblies 42 secured to the lower ends of the alternate ones of the support beams 34. The roller assemblies 42 are mounted with housings 43 having first and second roller members 45 and 46 in contact with respective opposite sides of the bed plate 24 and lateral movement restricted by horizontally extended rollers 48 engageable with the respective outer peripheral upright edges of the bed plate 24. It is seen that the support frame 28 is movable longitudinally on the pallet 23 and held in the proper axial alignment therewith by the roller assemblies 42 similar to a train moving along a conventional track therefor.

The concrete slab forming machine 21 further includes a hopper means 50 mounted on the forward portion of the support frame 28 having first and second hoppers 52 and 53 with a reinforcing mesh distributing means 55 mounted therebetween. The first and second hoppers 52 and 53 are substantially identical each having a main body 57 secured to a pair of parallel horizontally extended channels 58 having the rearward ends thereof pivotally connected to rod members 60 connected to brackets 62 which, in turn, are secured to the U-shaped beams 34. The forward ends of the support channels 58 are supported on an upper surface of the adjacent ones of the tubular members 36 and 38 by adjustable nut assemblies 63 to regulate the level of the first and second hoppers 52 and 53, respectively. Additionally, the first and second hoppers 52 and 53 are pivotally movable upwardly about the respective rod members 60 by piston and cylinder assemblies 65 secured to the respective tubular members 36 or 38. Each piston and cylinder assembly 65 has a cylinder 67 connected to the respective tubular members 36 and 38 and outer ends of axially movable piston rods 68 pivotally connected to the support channels 58. It is obvious that the piston rods 68 are extendable to rotate the first and second hoppers 52 and 53, respectively, clockwise, as viewed in FIG. 1, for the purposes of cleaning the same.

The first and second hoppers 52 and 53 are adapted to hold a large quantity of slump concrete material and discharge the same as by gravity through rectangular shape openings 71 and 72, respectively, into the bed plate 24 of the pallet 23 during operation. The lower peripheral edges of the openings 71 and 72 are extended horizontally and positioned at a pre-selected distance above the pallet 23 for reasons to become obvious. It is also obvious that the nut assemblies 63 are operable to regulate the vertical distance of the openings 71 and 72 from the bed plate 24 for best results.

As shown in FIGS. 5 and 6, the reinforcing distributing means 55 includes a cylindrical arbor 74 extended horizontally between the hoppers 52 and 53 having opposite ends thereof rotatably connected to upright posts 75 which, in turn, are secured to the parallel tubular members 36 and 38, respectively. The arbor 74 is adapted to receive a cylinder of reinforcing wire mesh 77 having a width substantially equal to the size of the concrete slab to be produced whereupon the mesh 77 is laid horizontally and the slump concrete material discharged from the second hopper 53 progressively covers the mesh 77 as will be explained. It is obvious that the reinforcing wire mesh 77 can be of any desired size or strength for the required end results of the concrete slab being produced.

Immediately behind the first hopper 52 and extended horizontally the entire remaining length of the support frame 28 are a plurality of elongated core members 79 having initial forming sections 81 interconnected by a horizontally extended upper support plate 82. In turn, the plate 82 is releasably secured to the sidewalls 31 to rigidly hold the core members 79 in the horizontally extended position. The core members 79, as illustrated, are elongated hollow tubes having the forward initial forming sections 81 of a half cylinder shape in transverse cross section and integral final forming sections 84 of cylindrical shape extended rearwardly therefrom. The initial forming sections 81 and the plate 82 extend rearwardly to a position within the vertical alignment of the discharge opening 72 of the second hopper 53 for reasons to be explained. In this particular embodiment, seven core members 79 evenly spaced between the sidewalls 31 are shown; however, it is obvious that any number of core members 79 can be used having various sizes and configurations thereof to achieve a given end product of the cored concrete slab.

In order to achieve complete agitation and filling of the voids within the fresh concrete material mixture from the hopper means 50, a first and second vibrator means 86 and 87 are mounted immediately rearwardly of the first and second hoppers 52 and 52, respectively. As shown in FIGS. 6, 7 and 8, the first vibrator means 86 has a main vibrating mold 89 pivotally connected as by pin member 91 to the first hopper 52. The mold 89 resembles a sled structure having an upper flat surface 92 and a lower or bottom contoured surface 94 resembling the initial forming sections 81 of the core members 79. Mounted on the upper surface 92 centrally thereof is a heavy duty electric vibrator 96 such as a "Motomagnetic" (registered trademark) manufactured by Martin Engineering Company of Neponset, Ill. The vibrator 96 is operable on rotation of an unbalanced shaft at various speeds to achieve the desired and required vibration into into the freshly poured concrete material to maintain the smooth flow thereof. As shown in FIG. 7, the vibrating mold 89 is isolated from the structure of the support frame 28 and the first hopper 52 by insulation strips 98 to minimize the transfer of the vibrations to anywhere but the initial portion of poured concrete material. It is seen that the configuration of the mold 89 operates to channel the concrete material rearwardly between the core members 79, the support plate 82, and the bed plate 24 for the initial forming operation of the concrete slab.

The second vibrator means 87 is substantially identical to the first vibrator means 86 except having a lower surface 101 of the mold 89 extended in a flat horizontal plane. However, the second vibrator means 87 is identically pivotally connected to the second hopper 53 by a pin 103 and isolated therefrom by the insulation strips 98. The second vibrator means 87 acts to agitate the freshly poured concrete material from the second hopper 53 to initially start the finishing of the upper surface of the concrete slab being produced. The lower surface 101 of the second vibrator means 87 is sufficiently spaced vertically from the core members 79 to give the desired thickness of the final cored slab product. Immediately rearward of the second vibrator means 87 is a pressure mold assembly 102 operable to maintain the correct thickness of the concrete slab being produced.

Rearwardly of the second hopper 53 and its corresponding vibrator means 87 is a pair of troweling means 104 and 105 and a main control means 107 mounted therebetween. As the troweling means 104 and 105 are substantially identical, only one need be described in detail. As best shown in FIGS. 5A and 6A, the troweling means 104 includes a large roller member 108 horizontally extended substantially the entire distance between the sidewalls 31 and perpendicular thereto. Opposite ends of the roller member 108 are rotatably carried on support arms 110 which are secured to a connecting shaft 112 secured to the respective tubular members 36 and 38 by bearing mounts 114. A hydraulic motor 115 is connected to one support arm 110 and connected to the adjacent end of the roller member 108 by a chain and gear arrangement (not shown). A lever arm 117 is connected to each end of the shaft 112 by having adjustment screws 118 engageable with the surface of the adjacent tubular members 36 and 38 to regulate the desired height of the outer lowermost surface of the roller member 108 relative to the working surface of the freshly poured concrete. Additionally, the piston and cylinder assemblies 121 and 122 are connected to the respective arms 110 of the troweling means 104 and 105 and are operable on axial movement of a piston rod 124 therein to raise and lower the roller members 108 relative to the support frame 28 to regulate the pressure of the rotating roller members 108 upon the freshly poured concrete. The motor 115 is powered through inlet and outlet fluid lines 126 and 127; however it is obvious that the fluid flow thereto can be alternated so that the roller members 108 can be rotated in either direction. Although only the pair of troweling means 104 and 105 have been illustrated, it is obvious that another such troweling means can be mounted behind the main control means 107 depending on the type of finish desired on the cored slab being produced.

Attached to the rearwardmost one of the U-shaped support beams 34 is an electrical supply power cable 130 connectable to an outside source and leading into the main control means 107. As shown in FIGS. 6A and 14, the control means 107 includes an outer housing 132 having a lid 134 thereon movable to an open position, as shown in dotted lines in FIG. 1A, to permit access to a control panel 136. Within the housing 132 is mounted a motor 138 connected to a variable displacement piston pump 139 to supply working fluid to the piston and cylinder assemblies 65 on the first and second hoppers 52 and 53, respectively; the piston and cylinder assemblies 121 and 122 on the troweling means 104 and 105, respectively; and the means for propelling the machine 21 as will be explained.

As shown in FIG. 14, the control panel 136 includes conventional stop and start buttons 141 and 142 to energize the pump 139 and the motor 138; levers 144 and 145 to actuate the first and second hoppers 52 and 53, respectively, for raising and lowering the same; switches 147 and 148 to actuate the electrical vibrating means 86 and 87 and variable knobs 149 to control the amount of vibration; levers 150 and 151 to actuate the piston and cylinder assemblies 121 and 122 to raise and lower the troweling means 104 and 105, respectively, and a control knob 153 and a machine indicator 154 to propel the machine 21 at the required speed. Additionally, the running time of the machine 21 in number of hours are indicated on a counter 156 and the fluid pressure from the pump is visably indicated on the indicating gauge 158.

In order to propel the heavy concrete slab forming machine 21 of this invention on the roller assemblies 42 along the pallet 23, a plurality of hydraulic cam drive assemblies 160, 161, 163 and 164 are used to gradually and continuously move the same (FIGS. 1 and 3). As the cam assemblies 160, 161, 163 and 164 are substantially identical in structure, only the cam drive assembly 160, as shown in FIG. 3 will be described in detail.

The cam drive assembly 160 includes a cam shoe 166 adapted to engage the pallet 23 and a piston and cylinder assembly 167 connected thereto. The piston and cylinder assembly 167 includes a hydraulic cylinder 169 having one end pivotally connected to a forwardly adjacent support beam 34 and a piston 171 slidably mounted in the cylinder 169 having a piston rod 173 extended rearwardly therefrom and pivotally connected by a pin 174 to an actuator or cam lever 176.

Hydraulic fluid lines 178 and 179 are connected to the cylinder 169 to supply and receive fluid therefrom to actuate axial movement of the piston 171 and the interconnected rod 173 in a conventional manner. The outer rearwardmost end of the piston rod 173 is also connected to lugs 181 and 182 on which are mounted roller bearings 183 and 184, respectfully, slidably mounted within a channel 186 secured to the underside of the adjacent tubular member 36. It is seen that the bearings 183 and 184 within the channel 186 operates to control axial movement of the piston rod 173 in a substantial horizontal plane.

As shown in FIG. 4, the cam shoe 166 further includes a housing 188 pivotally connected to the lower end of the actuator lever 176 by a stub shaft 189. The shoe housing 188 has a leg 191 of L-shape in transverse cross section adapted to engage the undersurface and end portion of the bed plate 24 of the pallet 23. The lower end of the cam or actuator lever 176 is engageable with an upper surface of the bed plate 24 aligned with the leg 191 to clamp the same therebetween. The actuator lever 176 is of a substantially triangular shape pivotal about the stub shaft 189 on actuation of the piston and cylinder assembly 167 as will be described. Additionally, the actuator lever 176 is integrally formed with a forwardly, upwardly inclined projection 193 having a cut out section 195 adapted to receive one end of a compression spring 197. The other end of the compression spring 197 is mounted within an aligned hole 199 in the upper adjacent portion of the shoe housing 188. As shown in FIG. 3, it is obvious that the compression spring 197 is operable to rotate the actuator lever 176 clockwise, as viewed in FIG. 3, about the stub shaft 189 to engage a lower cam surface 201 thereof with an upper adjacent surface of the bed plate 24.

In the use and operation of the cam drive assembly 160, the retracted position thereof is shown in dotted lines in FIG. 3 whereupon fluid under pressure is supplied through line 178 against the piston 171 and the cylinder 169. The piston rod 173 is moved rearwardly to force the actuator lever 176 about the stub shaft 189 to clamp the bed plate 24 between the cam surface 201 and the leg 191. The fluid pressure now acts to move the cylinder 169 and interconnected support frame 28 forwardly relative to the stationary piston 171 and the rod 173 to the fully extended position of FIG. 4. Next, the fluid flow is reversed with fluid pressure supplied through the line 179 to move the rod 173 forwardly. This pivots the actuator lever 176 counterclockwise, as viewed in FIG. 3, whereby the cam shoe 166 is freely movable forwardly to a position adjacent the cylinder 169. The compression spring 197 operates to maintain contact of the actuator lever 176 with the bed plate 24 to eliminate lost motion therein during the driving movement thereof. It is seen that the cam drive assemblies 160, 161, 163 and 164 are similarly operable to propel the machine 21 with the respective pairs 160, 161 and 163, 164 operable sequentially to provide a continuous and smooth motion thereof. It is obvious that forward speed of the machine 21 is readily controlled by the pressure and quantity of fluid supplied to the cam drive assemblies 160, 161, 163, and 164. The main control means 107 of this invention is to be the subject matter of separate patent application; however, reference is made to the schematic diagram of FIG. 15 in describing the general operation thereof in controlling the variable elements in movement of the concrete slab forming machine 21 of this invention. Inlet fluid is supplied from a reservoir 202 to the pump 139 whereupon the developed high pressure fluid is supplied to the main portion of the system through line 204 or to the hydraulic motors 115 of the troweling means 104 and 105 through a line 206. A fluid flow control valve 207 is operable to control fluid flow and the rotational speed of the troweling means 104 and 105 with the fluid discharged through a filter 208 back into the common reservoir 202.

The high pressure fluid is supplied through lines 204 and 210 to the control panel 136 where the levers 144 and 145 are operable to control fluid flow to the piston and cylinder assemblies 65 on the first and second hoppers 52 and 53, respectively, to raise and lower the same as required for cleansing purposes. Additionally, fluid through lines 204, 210 to a line 212 is controlled by the levers 150 and 151 to supply fluid to the first and second troweling means 104 and 105. More specifically, the levers 150 and 151 are connected by lines 213, 214 and 215, 216, respectively, through the piston and cylinder assemblies 121 and 122 to raise and lower the roller members 108 as required to achieve the desired finish on the concrete slab being produced.

The pressure fluid from the pump 139 is also fed through the line 204 to lines 217 and 218 to fluid flow control valves 219 and 221, respectively, which in turn, by lines 224 and 225 are connected through lines 178 to the pairs of cam drive assemblies 160, 161 and 163, 164 respectively. It is seen that each pair of the cam drive assemblies 160, 161, and 163, 164 are respectively extended or retracted as a unit to provide for the smooth forward movement of the machine 21. Additional lines 227 and 228 are connected to lines 179 of the cam drive assemblies 160, 161, and 163, 164 having a four-way control valve 230 therein directing fluid selectively through a fluid control valve 232 to a timing motor 234 or through a line 235 to control valves 237 and 238 and back to the reservoir 202. The fluid control valves 219, 221, and 230 are of the solenoid actuated type operable to regulate the fluid flow into the opposite ends of the cylinders 169 of the cam drive assemblies 160, 161, and 163, 164 to control the extension and retraction of the respective piston rods 173. The timing motor 234 is of a fluid type operable to actuate the fluid control valves 219, 221, and 230 to control fluid flow to the cam drive assemblies 160, 161, and 163, 164. Further discussion of the intricacies of the drive mechanism of the concrete slab forming machine 21 of this invention is not deemed necessary as it is obvious that the control valves 219, 221, and 230 could be hand operated to control forward movement of the machine 21 as long as one set of the cam drive assemblies 160, 161, or 163, 164 are actuated simultaneously to move the machine 21 prior to the actuation of the other set of cam drive assemblies for the retraction thereof. This provides for the controlled continuous and smooth movement of the machine 21 necessary for the production of a high quality product.

In the use and operation of the concrete slab forming machine 21 of this invention, the machine 21 is mounted on the right hand end, as viewed in FIGS. 1 and 1A, of the pallet 23 with the cam shoe assemblies 160 engageable with the opposite sides of the bed plate 24 and the roller assemblies 42 in contact therewith. As shown in FIG. 4, an elongated resilient wiper seal 235 is mounted on each side mold plate 40 and engageable with the bed plate 24 to maintain the fresh slump concrete material within the confines of the sidewalls 31 and the pallet 23. Another embodiment of a seal is shown in FIG. 4A wherein a downwardly depending wiper seal 237 is engageable with a protrusion 238 on the bed plate 24 to seal the longitudinally movable machine 21 therewith. A plurality of elongated strands 239 are rigidly secured to opposite ends of the pallet 23 and spaced above the same (FIG. 2). These strands 239 illustrated as numbering eight, are equally spaced between the sidewalls 31 and placed under a tension force of approximately 70 percent of the ultimate strength of the strands 239. It is seen that these strands 239 will be formed within the concrete slab resulting in the pre-stressing thereof for added strength.

As shown in FIG. 2, at the forward end of the concrete slab forming machine 21 is a plurality of strand support hangers 241 each engageable with a respective one of the strands 239 to hold the same in the proper axial alignment during the slab forming operation. Each strand support hanger 241 has a readily releasable strand grip section 234 adjustably connected to a downwardly depending bolt member 244 whereby the height of the strand 239 relative to the pallet 23 can be readily adjusted. It is obvious that any number of strands 239 can be used to obtain a desired end product.

The first and second hoppers 52 and 53 are filled with a slump type concrete material which moves under gravity through the openings 71 and 72, respectively, onto the pallet 23. The first and second vibrating means 86 and 87 act to spread out the freshly poured concrete material, remove air pockets therefrom, and aid in the settling thereof about the core members 79. The cam drive assemblies 160, 161, and 163, 164 are actuated to move the concrete slab forming machine 21 forwardly at a desired speed whereupon the core members 79 are pulled into and through the fresh concrete material discharged through the first and second hopper members 52 and 53 (FIGS. 9 and 10). It is seen that the pulling of core members 79 through the freshly poured concrete acts to (1) wipe the inner surface of the hollow cores being formed therein to bring the moisture to the surface providing the same with a smooth forming surface, and (2) aid in removing the moisture therein for the fast setting up even though a slump like concrete material has been used. The freshly poured concrete material is initially formed into a half section as shown in FIG. 10 by the initial forming section 81 of the core members 79 and the wire mesh 77 through the distributing means 55 is inserted into the concrete material discharged from the second hopper 53. The troweling means 104 and 105 operate to smooth out the surface of the freshly poured concrete material to form the desired finish and they can be raised and lowered as required by the piston and cylinder assemblies 121 and 122, respectively. The roller members 108 of the troweling means 104 and 105 can be rotated in opposite directions to achieve a wiping action on the concrete slab to pull out moisture therein to achieve a glossy smooth surface if desired. It is obvious that the troweling means 104 and 105 and the vibrator means 86 and 87 can be adjusted by respective control levers on the control panel 136 depending on the size and thickness of the concrete slab being formed and the ASTM slump test of the material being used to achieve the desired end product.

It is seen that the concrete slab forming machine 21 is gradually movable forwardly to pull the core members 79 through the freshly poured concrete to leave a self-supporting concrete slab having the cross sectional configuration similar to that shown in FIG. 11. The machine 21 of this invention is operable to produce a cored concrete slab at the rate of six to ten feet per minute depending upon the desired speed with actuation of the cam drive assemblies 160, 161, and 163, 164.

As shown in FIGS. 11 to 13, inclusive, the concrete slab forming machine 21 of this invention can be used to form a slab of variable thickness having hollow cored sections of circular, oval, or other shapes in transverse cross section. The size and shape of the cored sections is determined as that required to meet a given load requirement with the larger cores resulting in a greater savings of raw material.

As shown in FIG. 16, the method of operating the concrete slab forming machine 21 of this invention acts to simply and efficiently produce elongated cored concrete slabs. In producing the concrete slabs, a plurality of the strands 239 are secured to opposite ends of the pallet 23 with considerable tension put thereon. Secondly, the machine 21 is placed upon the pallet 23 so as to be longitudinally movable thereon as shown by arrow 247 and the first and second hoppers 52 and 53 are provided with a slump concrete material for discharge onto the elongated pallet 23. On moving the machine 21 longitudinally, the concrete material is fed onto the bed plate 24, with the wire mesh 77 also being trained above the top surface of the concrete being formed by the initial forming sections 81 of the core members 79. Immediately rearwardly therefrom, the slump concrete material from the second hopper 53 is placed upon and covers the wire mesh 77 and the intermediate portions of the core members 79 and the machine 21 is continuously and gradually moved forwardly by the cam drive assemblies 160, 161, and 163, 164. The freshly poured concrete material is continuously agitated by the vibrator means 86 and 87 and given a finished surface by the troweling means 104 and 105 as the core members 79 are pulled through the concrete material. The pressure mold assembly 102 rigidly secured to the sidewalls 31 acts to achieve the desired thickness of the concrete material. It is seen that the longitudinal movement of the machine 21 operates to move the same relative to the pallet 23 and away from the freshly poured concrete to leave a self-supporting concrete slab structure as shown in FIG. 11. The method of this application operates to efficiently and effectively produce an elongated pre-stressed, reinforced concrete slab automatically with a minimum requirement of labor and power resulting in substantial monetary savings in concrete material while achieving a rigid, high strength, pre-stressed end product.

The new and novel machine of this invention is unique in that it operates to produce a self-supporting, pre-stressed, reinforced cored concrete slab from an initial concrete material having a slump test between 0.5–4.0 under the ASTM testing procedures. This means that the use of a slump material results in a more consistent end product without having voids and defects therein which are conventionally found when using a dry or no slump type concrete material. Additionally, a uniform strong bond is established between the concrete and the pre-stressed strand because of the moisture laden slump concrete material which eliminates the strand slippage and loss of pre-stress often found when using a dry or no slump concrete material. Additionally, it is obvious that the slump material is easier to handle, and it has been found that a slump test of the concrete material between 1.0 to 2.5 is most desirable in producing the cored concrete slab product from the machine 21 of this invention.

The concrete slab forming machine of this invention results in a self-propelled machine operable to produce an elongated concrete core, pre-stressed, reinforced slab of indefinite length from a slump type material. The machine is self-propelled having a means for moving the same continuously and gradually down an elongated pallet. Additionally, the concrete slab forming machine of this invention is substantially maintenance free operable to save many man hours and material in the normal production of cored concrete slabs.

It will be apparent that the foregoing preferred specific embodiment of the applicant's concrete slab forming machine provides simple means for producing elongated, pre-stressed, reinforced, concrete slabs. Applicant's apparatus eliminates a great deal of time consuming and tedious work involved in producing elongated concrete slabs whereby monetary savings are achieved both in material and manpower.

While the invention has been described in connection with perferred specific embodiments thereof it will be understood that this invention is intended to illustrate and not to limit the scope of the invention, which is defined by the following claims.

I claim:
1. A concrete forming machine adapted to form continuous slabs from concrete material comprising:
   (a) a pallet,
   (b) a support frame having upright sidewalls said support frame mounted superimposed on said pallet adapted for movement therealong,
   (c) hopper means secured to said suport frame adapted to feed the concrete material onto said pallet,
   (d) means for supplying mesh reinforcing material into the concrete material on said pallet secured to said support frame,
   (e) troweling means secured to said suport frame engageable with the concrete material on said pallet for finishing the same,
   (f) means for continuously propelling said machine relative said pallet whereby the concrete material is continuously fed through said hopper means onto said pallet, and said supplying means places the mesh material below the upper surface of the concrete material to continuously form a reinforced concrete slab, and
   (g) said propeling means connected to said support frame selectively engageable with said pallet to continuously push said support frame longitudinally of said pallet.

2. A concrete forming machine as described in claim 1, including:
   (a) a core member secured to said support frame positioned adjacent said pallet and extended rearwardly of said hopper means, said core member having forward portions of semi-circular shape in transverse cross section interconnected by an upper horizontally extended plate member, said plate member extended integrally the distance betwen said sidewalls to contain and engage the concrete material thereunder,
   (b) said hopper means having first and second hoppers, said first hopper positioned at the forward end of said support frame and said second hopper positioned rearwardly of said first hopper and said mesh supplying means, and
   (c) said first hopper operable to feed concrete material to said forward portions of said core member thereby forming a half portion of the continuous slab.

3. A concrete forming machine as described in claim 2, wherein:
   (a) said core member having integral rearward portions of cylindrical shape in transverse cross section, and
   (b) said second hopper operable to feed concrete material to said rearward portions of said core member covered with mesh from said mesh supply means to form a self supporting hollow cored slab.

4. A concrete forming machine as described in claim 1, including:
   (a) vibrator means pivotally connected to said hopper means having insulation means to isolate vibrations thereof from said hopper means and said support frame.

5. A concrete forming machine as described in claim 1, wherein:
   (a) said support frame having a plurality of roller assemblies secured to said sidewalls engageable with said pallet providing for longitudinal movement of said support frame relative thereto, and
   (b) said propelling means having a plurality of cam shoe assemblies connected to said support frame selectively engageable with said pallet to continuously more said support frame longitudinally of said pallet.

6. A concrete forming machine as described in claim 5, wherein:
   (a) said cam shoe assemblies having a shoe member pivotaly secured to said sidewalls, respectively, and a hydraulically actuated piston assembly connected to each of said shoe members to pivot the same into and out of engagement with said pallet, and
   (b) said piston assemblies including cylinders connected to said support frame, respectively, and axially movable rod members mounted in said cylinders having the outer ends thereof connected to said shoe members whereby said cylinders are movable relative to said rod members to clamp said pallet between said cam shoes and longitudinally move said support frame.

7. A concrete forming machine as described in claim 6, wherein:
   (a) said propelling means having control means connected to said piston assemblies to sequentially operate the same whereby at least one of said cylinders is being extended at any given time to propel said support frame to provide for the continuous, gradual, forward movement thereof.

References Cited

UNITED STATES PATENTS

| | | | |
|---|---|---|---|
| 2,878,544 | 3/1959 | Dilday | 25—32 |
| 2,964,819 | 12/1960 | Toms et al. | 25—104 X |
| 3,145,444 | 8/1964 | Brown et al. | 25—32 |
| 3,177,552 | 4/1965 | Roth et al. | 25—32 X |
| 3,292,227 | 12/1966 | Olds | 25—32 X |

J. SPENCER OVERHOLSER, Primary Examiner

R. D. BALDWIN, Assistant Examiner

U.S. Cl. X.R.

25—32